(12) United States Patent
Kando

(10) Patent No.: US 8,579,706 B2
(45) Date of Patent: Nov. 12, 2013

(54) GAME PROGRAM AND GAME DEVICE

(75) Inventor: Yuuji Kando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2407 days.

(21) Appl. No.: 11/304,714

(22) Filed: Dec. 16, 2005

(65) Prior Publication Data

US 2006/0258453 A1 Nov. 16, 2006

(30) Foreign Application Priority Data

May 10, 2005 (JP) ................................ 2005-136970

(51) Int. Cl.
A63F 9/24 (2006.01)

(52) U.S. Cl.
USPC .......................................................... 463/31

(58) Field of Classification Search
USPC .................................................... 463/43, 31
See application file for complete search history.

(56) References Cited

U.S. PATENT DOCUMENTS

| | | | | |
|---|---|---|---|---|
| 5,404,458 A * | 4/1995 | Zetts | ............................... | 710/73 |
| 5,523,775 A * | 6/1996 | Capps | ........................... | 345/179 |
| 5,590,219 A * | 12/1996 | Gourdol | ....................... | 382/202 |
| 6,234,901 B1 | 5/2001 | Nagoshi et al. | | |
| 6,329,991 B1 | 12/2001 | Fukuda et al. | | |
| 6,767,286 B1 | 7/2004 | Nagoshi et al. | | |
| 6,917,371 B1 | 7/2005 | Nagoshi et al. | | |
| 2001/0040586 A1 | 11/2001 | Yokoyama et al. | | |
| 2002/0060682 A1 | 5/2002 | Kohira et al. | | |
| 2003/0006982 A1 | 1/2003 | Yokoyama et al. | | |
| 2003/0179235 A1 * | 9/2003 | Saund et al. | .................. | 345/764 |
| 2003/0210817 A1 * | 11/2003 | Hullender et al. | ............ | 382/187 |
| 2003/0214536 A1 * | 11/2003 | Jarrett et al. | ................... | 345/831 |
| 2006/0212812 A1 * | 9/2006 | Simmons et al. | ............. | 715/539 |

FOREIGN PATENT DOCUMENTS

| | | |
|---|---|---|
| JP | 8-286808 | 11/1996 |
| JP | 10-201947 | 8/1998 |
| JP | 2000-149059 | 5/2000 |
| JP | 2000-245960 | 9/2000 |
| JP | 2002-062980 | 2/2002 |
| JP | 2002-140723 | 5/2002 |
| JP | 2002-282542 | 10/2002 |

OTHER PUBLICATIONS

Japanese Office Action dated Jul. 2, 2009 in corresponding Japanese Application No. 2005-136970.
Interrogation dated Nov. 4, 2010 in corresponding Japanese Application No. 2005-136970, 2 pages.
Interrogation dated Nov. 4, 2010 in corresponding Japanese Application No. 2005-136970.

* cited by examiner

Primary Examiner — Arthur O. Hall
Assistant Examiner — Steve Rowland
(74) Attorney, Agent, or Firm — Nixon & Vanderhye P.C.

(57) ABSTRACT

A piece of coordinate data indicating coordinates, which are inputted via a touch panel, is sequentially stored into a RAM. A piece of coordinate data in a coordinate data array stored in the RAM is sequentially invalidated when a predetermined time has passed after the piece of coordinate data has been stored into the RAM, and game processing is performed by using a valid coordinate data array. Further, an image of an operation track which comprises points respectively corresponding to a plurality of pieces of valid coordinate data stored in the RAM is generated, the image having a width which changes according to a remaining time until each of the plurality of pieces of valid coordinate data is invalidated. A game image including the image of the operation track is displayed.

11 Claims, 19 Drawing Sheets

FIG. 15

| FRAME NUMBER | INPUT COORDINATES |
|---|---|
| 1 | NONE |
| 2 | NONE |
| 3 | (X1,Y1) |
| 4 | (X1,Y1) |
| 5 | (X1,Y1) |
| 6 | (X2,Y2) |
| 7 | (X3,Y3) |
| 8 | (X4,Y4) |
| 9 | (X5,Y5) |
| 10 | (X6,Y6) |
| 11 | (X7,Y7) |
| 12 | (X8,Y8) |
| 13 | (X9,Y9) |
| 14 | (X10,Y10) |
| 15 | (X11,Y11) |
| 16 | (X12,Y12) |
| 17 | (X13,Y13) |
| 18 | (X14,Y14) |
| 19 | NONE |
| 20 | NONE |
| ⋮ | ⋮ |

FIG. 16

THIRD FRAME

| OPERATION TRACK INFORMATION | | 52 |
|---|---|---|
| REFERENCE NUMBER | INPUT COORDINATES | REMAINING VALID TIME |
| P1 | (X1,Y1) | 10 |

FIG. 17

SIXTH FRAME

| OPERATION TRACK INFORMATION | | 52 |
|---|---|---|
| REFERENCE NUMBER | INPUT COORDINATES | REMAINING VALID TIME |
| P1 | (X1,Y1) | 7 |
| P2 | (X2,Y2) | 10 |

FIG. 18

SEVENTH FRAME

| OPERATION TRACK INFORMATION | | 52 |
|---|---|---|
| REFERENCE NUMBER | INPUT COORDINATES | REMAINING VALID TIME |
| P1 | (X1,Y1) | 6 |
| P2 | (X2,Y2) | 9 |
| P3 | (X3,Y3) | 10 |

FIG. 19

THIRTEENTH FRAME

OPERATION TRACK INFORMATION 52

| REFERENCE NUMBER | INPUT COORDINATES | REMAINING VALID TIME |
|---|---|---|
| P1 | (X1,Y1) | 0 |
| P2 | (X2,Y2) | 3 |
| P3 | (X3,Y3) | 4 |
| P4 | (X4,Y4) | 5 |
| P5 | (X5,Y5) | 6 |
| P6 | (X6,Y6) | 7 |
| P7 | (X7,Y7) | 8 |
| P8 | (X8,Y8) | 9 |
| P9 | (X9,Y9) | 10 |

FIG. 20

SIXTEENTH FRAME

| OPERATION TRACK INFORMATION | | 52 |
|---|---|---|
| REFERENCE NUMBER | INPUT COORDINATES | REMAINING VALID TIME |
| P1 | (X1,Y1) | 0 |
| P2 | (X2,Y2) | 0 |
| P3 | (X3,Y3) | 1 |
| P4 | (X4,Y4) | 2 |
| P5 | (X5,Y5) | 3 |
| P6 | (X6,Y6) | 4 |
| P7 | (X7,Y7) | 5 |
| P8 | (X8,Y8) | 6 |
| P9 | (X9,Y9) | 7 |
| P10 | (X10,Y10) | 8 |
| P11 | (X11,Y11) | 9 |
| P12 | (X12,Y12) | 10 |

| OPERATION TRACK ELEMENT IMAGE BETWEEN Pc-Pd | DISTANCE BETWEEN Pc-Pd<br>⟵────⟶<br>▨▨▨▨▨▨▨▨▨ ↕10 |
|---|---|
| OPERATION TRACK ELEMENT IMAGE BETWEEN Pb-Pc | DISTANCE BETWEEN Pb-Pc<br>⟵────⟶<br>▨▨▨▨▨▨▨ ↕9 |
| OPERATION TRACK ELEMENT IMAGE BETWEEN Pa-Pb | DISTANCE BETWEEN Pa-Pb<br>⟵────⟶<br>▨▨▨▨▨▨ ↕8 |

| | |
|---|---|
| OPERATION TRACK ELEMENT IMAGE BETWEEN Pc-Pd | DISTANCE BETWEEN Pc-Pd <br> 9 ▭ 10 |
| OPERATION TRACK ELEMENT IMAGE BETWEEN Pb-Pc | DISTANCE BETWEEN Pb-Pc <br> 8 ▭ 9 |
| OPERATION TRACK ELEMENT IMAGE BETWEEN Pa-Pb | DISTANCE BETWEEN Pa-Pb <br> 7 ▭ 8 |

GAME PROGRAM AND GAME DEVICE

CROSS REFERENCE TO RELATED APPLICATION

The disclosure of Japanese Patent Application No. 2005-136970 is incorporated herein by reference.

TECHNICAL FIELD

The exemplary embodiments disclosed herein relate to a game program and a game device, and particularly relate to a game program and a game device which use, as an input device, coordinate input means such as a touch panel.

BACKGROUND AND SUMMARY

Conventionally, there has been a technique that allows a game device to recognize, for example, figures inputted by using coordinate input means (i.e., a pointing device such as a touch panel or a mouse) into the game device.

Japanese Laid-Open Patent Publication No. 2000-245960, i.e., a patent document 1 discloses a technique that uses, for game processing, recognition results of, for example, figures inputted into a game device via a touch panel. In addition, the patent document 1 discloses that the game device outputs sound in order to prompt a player to perform an input operation after the player has not performed the input operation with the touch panel for a particular period of time, sets a time limit for accepting the input operation, and displays, on a screen, a remaining time which is until the device finishes accepting the input operation.

However, in some cases, the above described manner disclosed in the patent document 1 for prompting a player to perform the input operation with the pointing device may not be appropriate. For example, when a player plays a certain type of game, the player might get annoyed if, every time the player performs the input operation with the touch panel, a game device outputs the sound, sets the time limit and displays the remaining time as described above. Also, the above described sound and display interfere with smooth sound output and image display of the game.

Therefore, a feature of certain exemplary embodiments is to provide a game program and a game device which are capable of appropriately informing, when required, a player that an input operation using coordinate input means is required to be performed quickly.

Certain exemplary embodiments have the following aspects to attain the feature mentioned above. Note that reference numerals and the like indicated between parentheses are merely provided to facilitate the understanding of the certain exemplary embodiments described herein in relation to the drawings, rather than limiting the scope of the certain exemplary embodiments in any way.

A first aspect of certain exemplary embodiments is a computer-readable storage medium storing a game program for causing a computer (21), which is connected to display means (12) for displaying a game image, coordinate input means (15) for inputting coordinates corresponding to a point on a screen of the display means and a memory (24) for temporarily storing data, to function as storing means, invalidating means, game processing means, track image generating means and display control means. The storing means is for, from a start of coordinates inputting until an end of coordinates inputting by the coordinate input means, sequentially storing into the memory, as a piece of valid coordinate data, a piece of coordinate data indicating the coordinates inputted by the coordinate input means (S46); the invalidating means is for sequentially invalidating a piece of valid coordinate data in a valid coordinate data array stored in the memory, when a predetermined period of time has passed after the piece of valid coordinate data has been stored into the memory (S40); the game processing means is for performing game processing by using the valid coordinate data array stored in the memory (S18 to S28); track image generating means is for generating an image of an operation track which comprises points respectively corresponding to a plurality of pieces of valid coordinate data stored in the memory, the image having a display mode which partially changes according to a remaining time until each of the plurality of pieces of valid coordinate data stored in the memory is invalidated by the invalidating means (S16); and display control means is for causing the display means to display, according to a result of the game processing by the game processing means, a game image including the image of the operation track generated by the track image generating means (S32).

"Invalidate a piece of coordinate data" of the above first aspect means, for example, setting a value which indicates the remaining valid time of the piece of coordinate data to "0", deleting the piece of coordinate data from the memory, or setting a flag which indicates whether or not the piece of coordinate data is valid to "invalid". On the other hand, "a piece of valid coordinate data" means, for example, a piece of coordinate data whose remaining valid time is indicated by the above value as "1" or greater, or a piece of coordinate data stored in the memory (i.e., a piece of coordinate data which has not been deleted from the memory), or a piece of coordinate data stored in the memory regarding which the flag, which indicates whether or not the piece of coordinate data is valid, is set to "valid".

In a second aspect of certain exemplary embodiments based on the above first aspect, the track image generating means partially changes a width of the image of the operation track.

In a third aspect of certain exemplary embodiments based on the above first aspect, the track image generating means partially changes a color of the image of the operation track.

In a fourth aspect of certain exemplary embodiments based on the above first aspect, the image of the operation track, which is generated by the track image generating means, comprises a plurality of operation track element images (FIG. 23) respectively corresponding to line segments which respectively connect points respectively corresponding to a plurality of pieces of valid coordinate data, the points being connected in an order in which the plurality of pieces of valid coordinate data has been inputted; and the track image generating means changes the display mode of each of the plurality of operation track element images, according to a remaining time until a piece of coordinate data of at least one end of a corresponding line segment is invalidated by the invalidating means.

In a fifth aspect of certain exemplary embodiments based on the above fourth aspect, the track image generating means gradually narrows a width of each of the plurality of operation track element images as the remaining time decreases, the remaining time being a time period until a piece of coordinate data of at least one end of a corresponding line segment is invalidated by the invalidating means.

In a sixth aspect of certain exemplary embodiments based on the above fourth aspect, the track image generating means gradually lightens a color of each of the plurality of operation track element images as the remaining time decreases, the remaining time being a time period until a piece of coordinate data of at least one end of a corresponding line segment is invalidated by the invalidating means.

In a seventh aspect of certain exemplary embodiments based on the above first aspect, the game processing means performs predetermined game processing (S20, S24, S28) corresponding to a predetermined condition (S18, S22, S26) when a shape of the operation track, which comprises points respectively corresponding to the valid coordinate data array stored in the memory, satisfies the predetermined condition.

An eighth aspect of certain exemplary embodiments is a computer-readable storage medium storing a game program for causing a computer (21), which is connected to display means (12) for displaying a game image, coordinate input means (15) for inputting coordinates corresponding to a point on a screen of the display means and a memory (24) for temporarily storing data, to function as storing means, invalidating means, game processing means and display control means. The storing means is for, from a start of coordinates inputting until an end of coordinates inputting by the coordinate input means, sequentially storing into the memory, as a piece of valid coordinate data, a piece of coordinate data indicating the coordinates inputted by the coordinate input means (S46); the invalidating means is for sequentially invalidating a piece of valid coordinate data in a valid coordinate data array stored in the memory, when a predetermined period of time has passed after the piece of valid coordinate data has been stored into the memory (S40); the game processing means is for performing predetermined game processing (S20, S24, S28) corresponding to a predetermined condition (S18, S22, S26) when a shape of an operation track, which comprises points respectively corresponding to the valid coordinate data array stored in the memory, satisfies the predetermined condition; and the display control means for causing the display means to display a game image according to a result of the game processing by the game processing means (S32).

In a ninth aspect of certain exemplary embodiments based on the above eighth aspect, the predetermined condition is that a discretionarily-selected area on the screen is circled by the operation track.

In a tenth aspect of certain exemplary embodiments based on the above eighth aspect, the predetermined condition is that the operation track crosses a predetermined area on the screen.

An eleventh aspect of certain exemplary embodiments is a game device, comprising: display means (12) for displaying a game image; coordinate input means (15) for inputting coordinates corresponding to a point on a screen of the display means; a memory (24) for temporarily storing data; storing means (21) for, from a start of coordinates inputting until an end of coordinates inputting by the coordinate input means, sequentially storing into the memory, as a piece of valid coordinate data, a piece of coordinate data indicating the coordinates inputted by the coordinate input means; invalidating means (21) for sequentially invalidating a piece of valid coordinate data in a valid coordinate data array stored in the memory, when a predetermined period of time has passed after the piece of valid coordinate data has been stored into the memory; game processing means (21) for performing game processing by using the valid coordinate data array stored in the memory; track image generating means (21) for generating an image of an operation track which comprises points respectively corresponding to a plurality of pieces of valid coordinate data stored in the memory, the image having a display mode which partially changes according to a remaining time until each of the plurality of pieces of valid coordinate data stored in the memory is invalidated by the invalidating means; and display control means (21) for causing the display means to display, according to a result of the game processing by the game processing means, a game image including the image of the operation track generated by the track image generating means.

According to the above first aspect of certain exemplary embodiments, the display mode of the image of the operation track partially changes according to the remaining time until each of a plurality of pieces of coordinate data respectively corresponding to points constituting the operation track becomes invalidated. Therefore, a player can visually recognize the remaining valid time of each portion of the operation track, which has been drawn on the screen of the display means by using the coordinate input means. Thus, the player can easily recognize whether a speed of a coordinate input operation performed by the player was appropriate. This makes it possible to prompt, without generating warning sound from the game device or indicating a time limit, the player to quickly perform the coordinate input operation. Especially according to the above second and third aspects, the player can intuitively recognize the remaining valid time of each portion of the operation track. Especially according to the above fourth aspect, the image of the operation track is easily generated in any shape.

According to the above eighth aspect of certain exemplary embodiments, each piece of valid coordinate data inputted via the coordinate input means is sequentially invalidated according to a remaining valid time, and the predetermined game processing is performed when the shape of the operation track, which comprises points corresponding to the valid coordinate data array, satisfies the predetermined condition. Therefore, in order for the predetermined game processing to be performed, the player is required to quickly perform the input operation. This makes it possible to prompt, without generating warning sound from the game device or indicating a time limit, the player to quickly perform the coordinate input operation.

These and other features, aspects and advantages of the certain exemplary embodiments will become more apparent from the following detailed description of the certain exemplary embodiments when taken in conjunction with the accompanying drawings.

BRIEF DESCRIPTION OF THE DRAWINGS

FIG. 15 shows exemplary variations of input coordinates inputted via a touch panel;
FIG. 16 shows a state of operation track information 52 at third frame;

FIG. 17 shows a state of the operation track information 52 at sixth frame;

FIG. 18 shows a state of the operation track information 52 at seventh frame;

FIG. 19 shows a state of the operation track information 52 at thirteenth frame;

FIG. 20 shows a state of the operation track information 52 at sixteenth frame;

DETAILED DESCRIPTION

A configuration and a movement of a game device according to certain exemplary embodiments will be described below.

Figure 1:
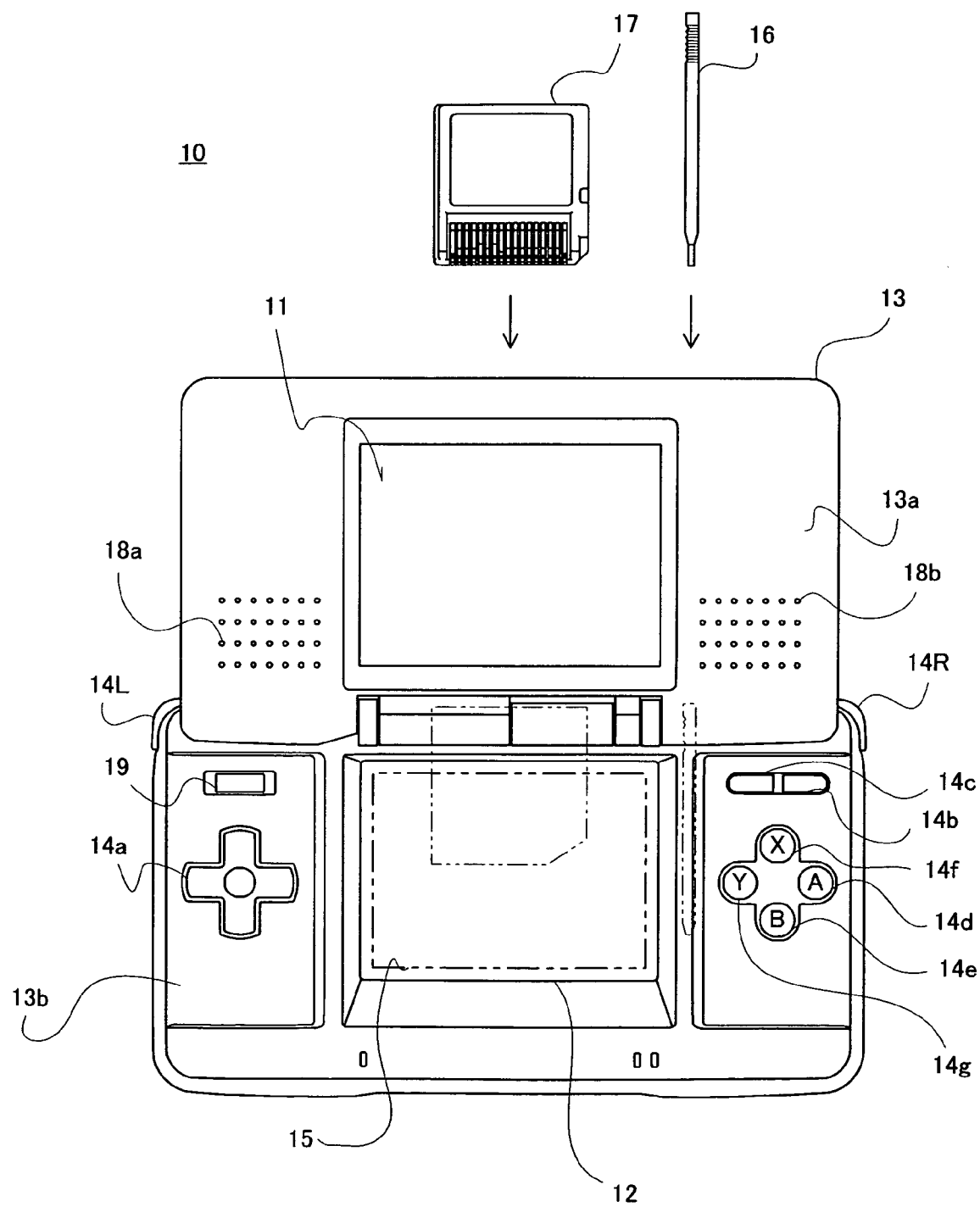
FIG. 1 is an external view of a game device according to a certain exemplary embodiment.

FIG. 1 is an external view of a game device according to a certain exemplary embodiment. In FIG. 1, a game device 10 includes a first LCD (Liquid Crystal Display) 11 and a second LCD 12. A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that though a LCD is used as a display device in this exemplary embodiment, any other display devices such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 2) to an exterior. A description of the pair of loudspeakers will be provided later.

The lower housing 13b is provided with input devices as follows; a cross switch 14a, a start switch 14b, a select switch 14c, a "A" button 14d, a "B" button 14e, a "X" button 14f, a "Y" button 14g, a "L" button 14L, and a "R" button 14R. In addition, a touch panel 15 is provided on a screen of the second LCD 12 as another input device. The lower housing 13b further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinate data which corresponds to a touch position. Though the following description is provided on an assumption that the player uses a stick 16 to operate the touch panel 15, of course the touch panel 15 may also be operated by a pen (stylus pen) or a finger instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in the insertion slot provided at the lower housing 13b in a removable manner.

Next, an internal configuration of the game device 10 will be described with reference to FIG. 2.

Figure 2:
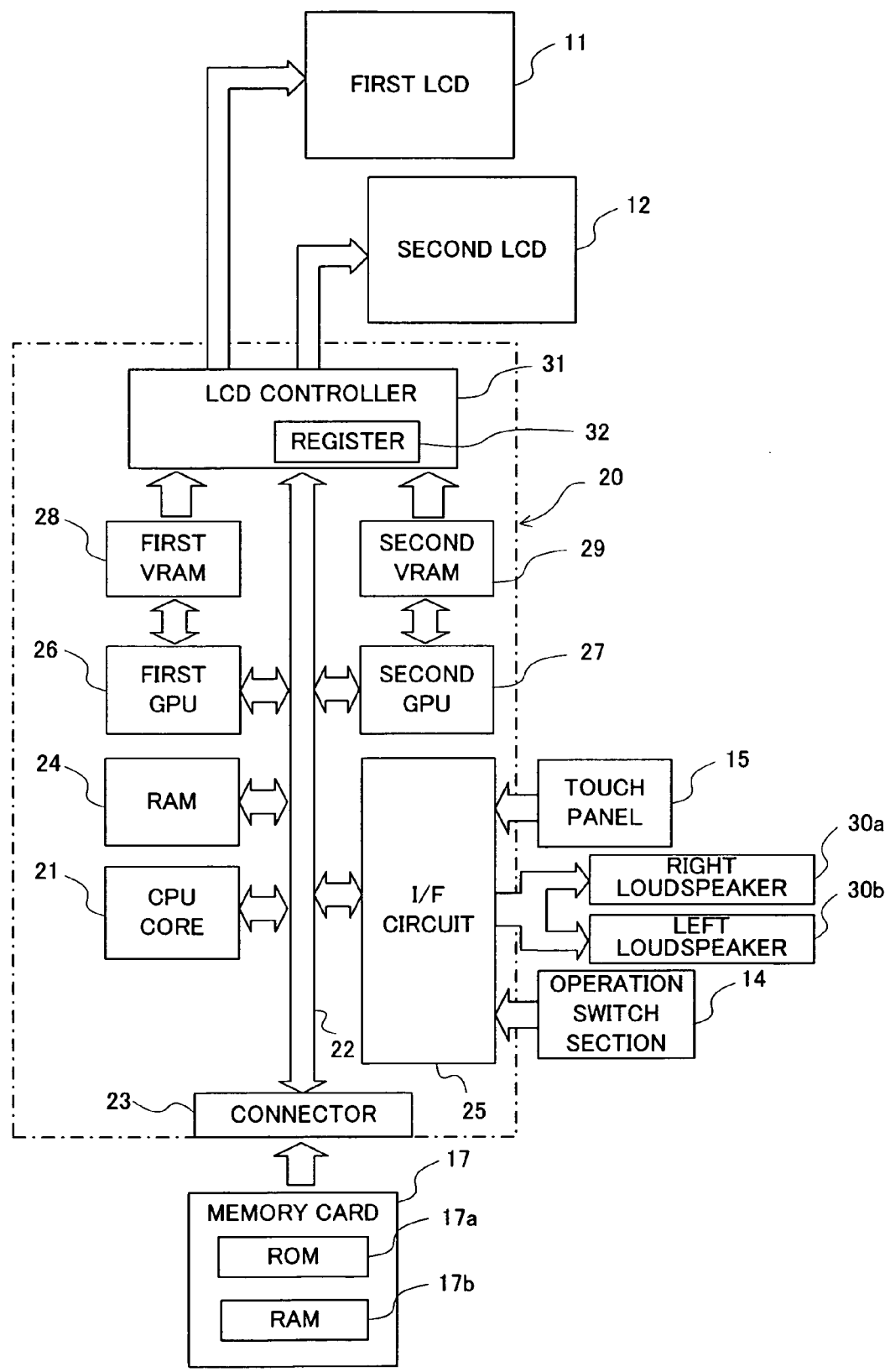
FIG. 2 is a block diagram showing an internal configuration of the game device.

In FIG. 2, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24 and a LCD controller 31. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, a touch panel 15, a right loudspeaker 30a, a left loudspeaker 30b and an operation switch section 14, which is comprised of a cross switch 14a, a "A" button 14d, and others, as shown in FIG. 1. The right loudspeaker 30a and the left loudspeaker 30b are arranged inside the sound holes 18a and 18b, respectively.

A first VRAM (Video RAM) 28 is connected to the first GPU 26, and a second VRAM 29 is connected to the second GPU 27. In accordance with an instruction from the CPU core 21, the first GPU 26 generates a first game image based on data used for image generation which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the first VRAM 28, and outputs to the second LCD 12 the second game image which has been written into the second VRAM 29. When the value of the register 32 is 1, the first game image which has been written into the first VRAM 28 is outputted to the LCD 12, and the second game image which has been written into the second VRAM 29 is outputted to the first LCD 11.

Further, the configuration of the game device 10 as mentioned above is merely an example. The certain exemplary embodiments described herein are applicable to any computer system which comprises a pointing device (touch panel, mouse, touch pad, etc) and at least one display device. Also, the game program of the certain exemplary embodiments described herein can be supplied to a computer system not only by the way of an external storage medium such as a memory card 17, but also by the way of a wired or wireless communication path. The program can also be recorded beforehand in a nonvolatile storage inside of a computer system.

Figure 3:
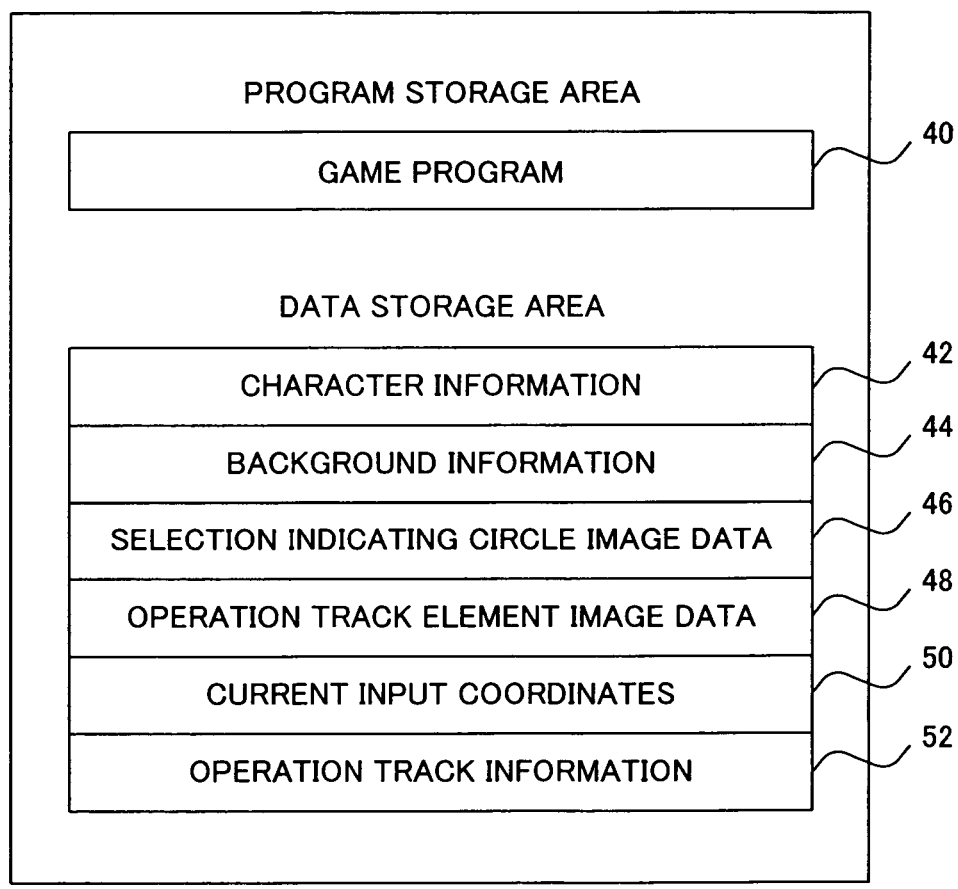
FIG. 3 is a memory map of a RAM.

FIG. 3 shows a memory map of the RAM 24. The RAM stores a game program 40, character information 42, background information 44, selection indicating circle image data 46, operation track element image data 48, current input coordinates 50 and operation track information 52.

The game program 40 is a program for causing the CPU core 21 to perform game processing. The game program 40 is loaded from the ROM 17a to the RAM 24 before the CPU core 21 performs the game processing.

The character information 42 is information regarding characters in a game world. Examples of the characters are a player character controlled by a player and an enemy character automatically controlled by a computer. The character information 42 contains, for example, image data, current position information and status information of each character in the game world. The image data is loaded from the ROM 17a to the RAM 24, and used to generate a game image. The current position information and status information are updated whenever necessary according to a progress made in the game.

The background information 44 is information concerning component elements such as a ground and an obstacle constituting a background of the game world. The background information also contains, for example, position information and image data.

The selection indicating circle image data 46 is image data of a circle or an ellipse (e.g., 54 of FIG. 7) which is, when a player selects one or more player characters (e.g., PC2 to PC4 shown in FIG. 5) as controlled objects, displayed on the screen such that the circle or ellipse encompasses the selected player characters. Hereinafter, an image of the circle (or an ellipse) is referred to as a selection indicating circle image. The selection indicating circle image can be generated at any size by properly setting a radius value of the selection indicating circle image data 46.

Figures 22, 23:
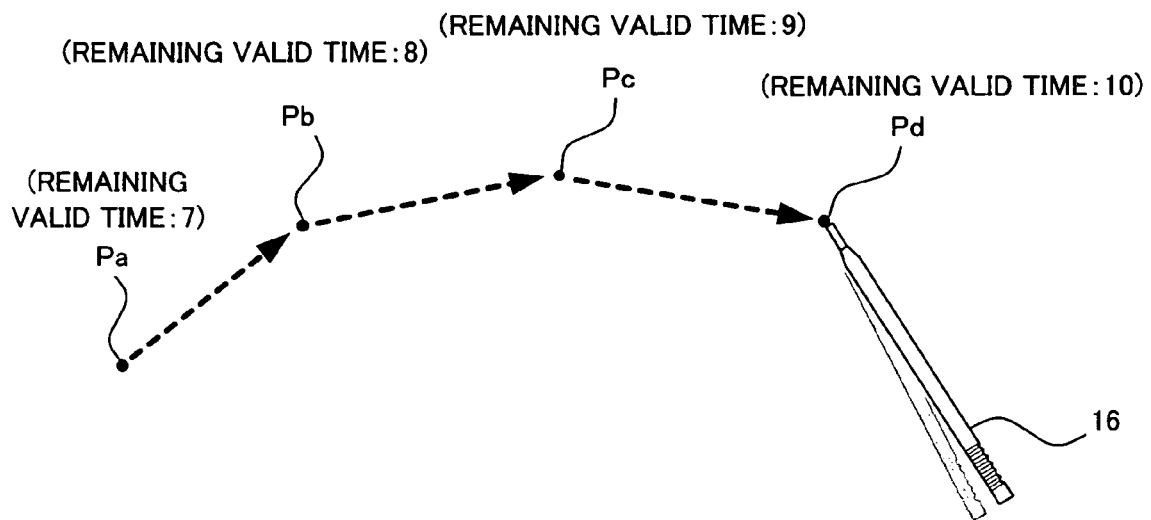
FIG. 22 shows an example of an operation track.
FIG. 23 shows an example of an operation track element image.

The operation track element image data 48 is image data for generating an image of a track (hereinafter, referred to as an operation track) which is made when a player slides the stick 16 on the touch panel 15. The image data is, for example, square-shaped polygon data as shown in FIG. 23. The operation track element image can be generated as any square-shaped image by properly setting a value of a length and a width of the operation track element image data 48.

The current input coordinates 50 are coordinates specifying a point where the stick 16 contacts the touch panel 15, and are updated as necessary at a predetermined cycle based on an output signal from the touch panel 15.

The operation track information 52 is information indicating a positional history of the points on which the stick 16 contacts the touch panel 15. For example, when a player slides the stick 16 on the touch panel 15, a track is made as a result, and a shape of the track is stored as the operation track information 52. By using the operation track information 52, for example, it can be determined whether the player has slid the stick 16 such that the track has circled a character displayed on the screen. The operation track information 52 will be described in detail later (FIGS. 16 to 20).

Next, a game executed according to the game program 40 will be briefly described with reference to FIGS. 4 to 12.

Figure 4:
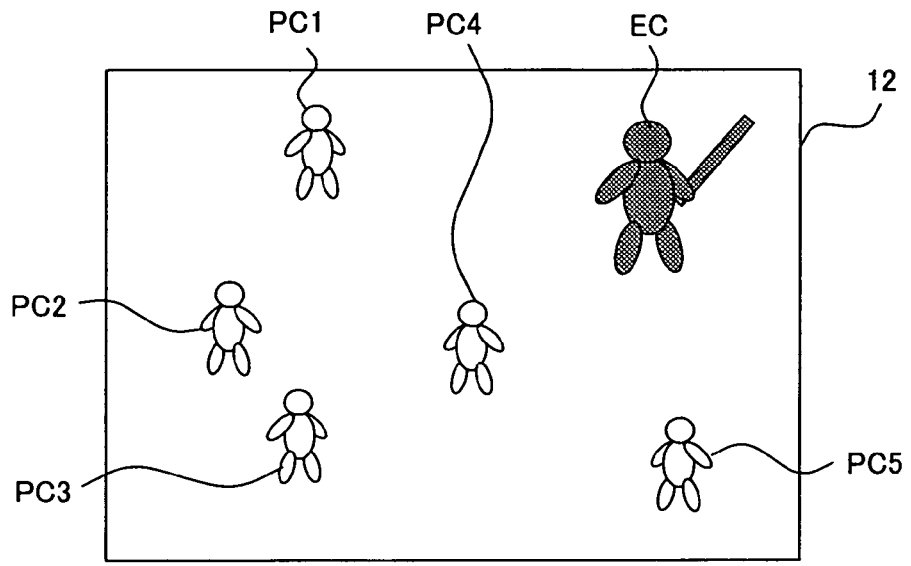
FIG. 4 shows an example of a game image.

When the game starts, as shown in FIG. 4, a state of the game world is displayed on the second LCD 12. In the game world, there exists five player characters PC1 to PC5 and one enemy character EC. The player characters PC1 to PC5 are controlled by a player, and the enemy character EC is automatically controlled by the computer. However, while the player does not perform any input operation, the computer controls the movement of the player characters PC1 to PC5 such that the player characters move as if at their own will. For example, one of the player characters sleeps, and another player character runs around in the game world. Note that, the game program may be configured such that the computer does not perform such movement control while the player does not perform any input operation.

Figure 5:
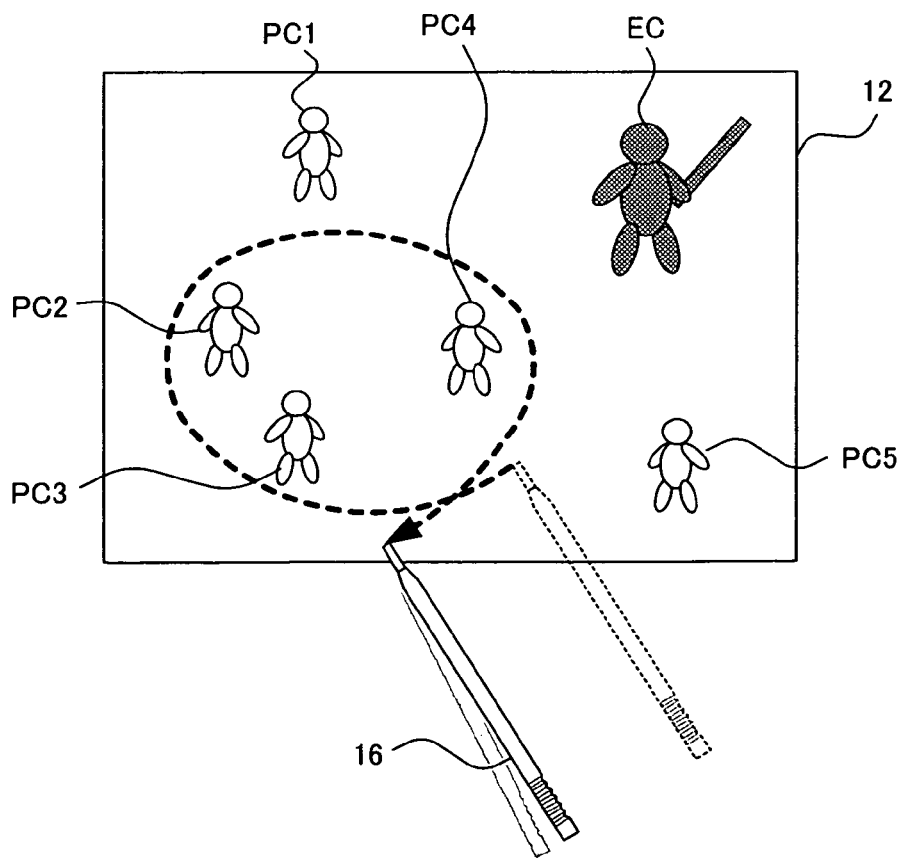
FIG. 5 shows another example of a game image.

The player is allowed to freely select, as controlled objects, one or more player characters among the five player characters PC1 to PC5. The player performs such a selection operation, as shown in FIG. 5, by circling, with the stick 16, player characters which the player wants to control (to be specific, by sliding the stick 16 on the touch panel 15 such that the stick 16 circles around displayed positions of the player characters which the player wants to control). In the case where the player uses a mouse as coordinate input means instead of the touch panel 15, the player may move, while pressing a mouse button, a mouse pointer displayed on the screen such that the pointer circles around the player characters which the player wants to control.

Figure 6:
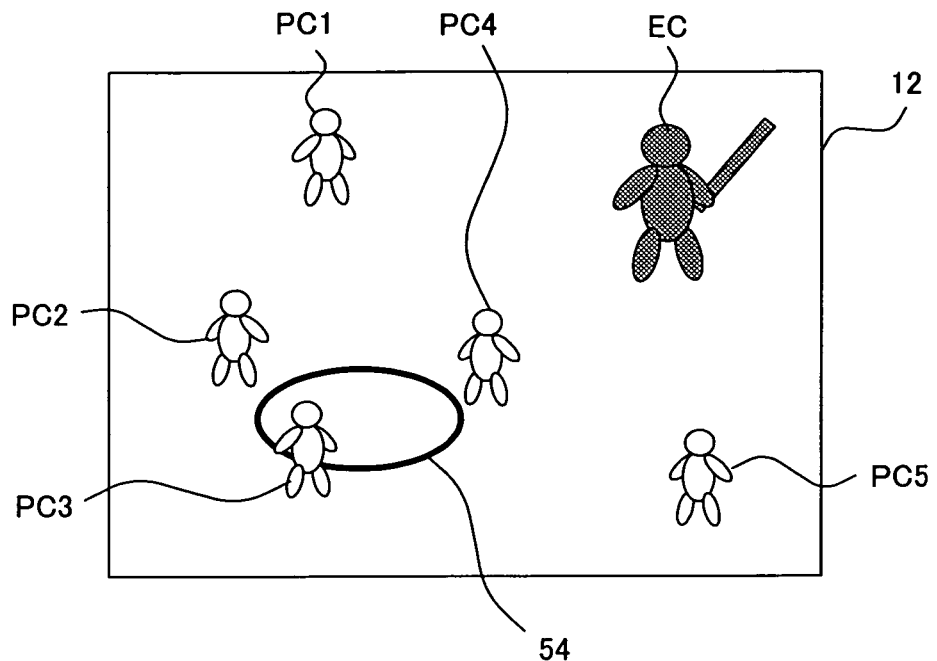
FIG. 6 shows further another example of a game image.
Figure 7:
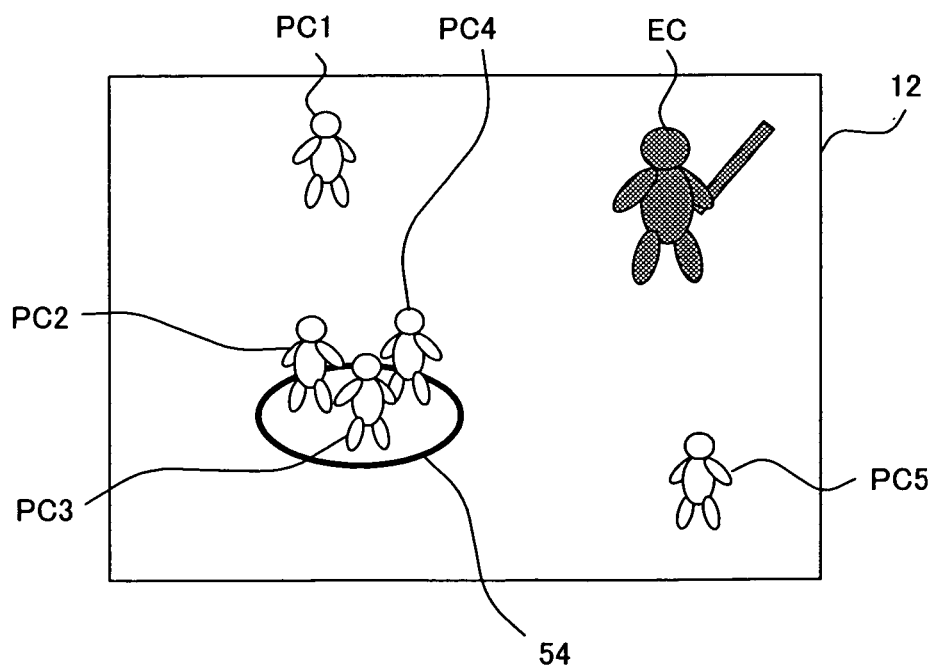
FIG. 7 shows further another example of a game image.

When the above selection operation is performed, the selection indicating circle image 54 is displayed, as shown in FIG. 6, on a middle point among the player characters which have been selected as the controlled objects (hereinafter, such a character will be referred to as a controlled object character), the middle point corresponding to coordinates which are obtained by averaging out, with respect to each coordinate axis, coordinate values of controlled object characters. Then, the controlled object characters start moving toward inside the selection indicating circle image 54. As a result, as shown in FIG. 7, the controlled object characters gather, and wait for an instruction from the player. Thereafter, the player is allowed to give the controlled object characters a movement instruction, an attack instruction or a dispersion instruction via the touch panel 15.

Figure 8:
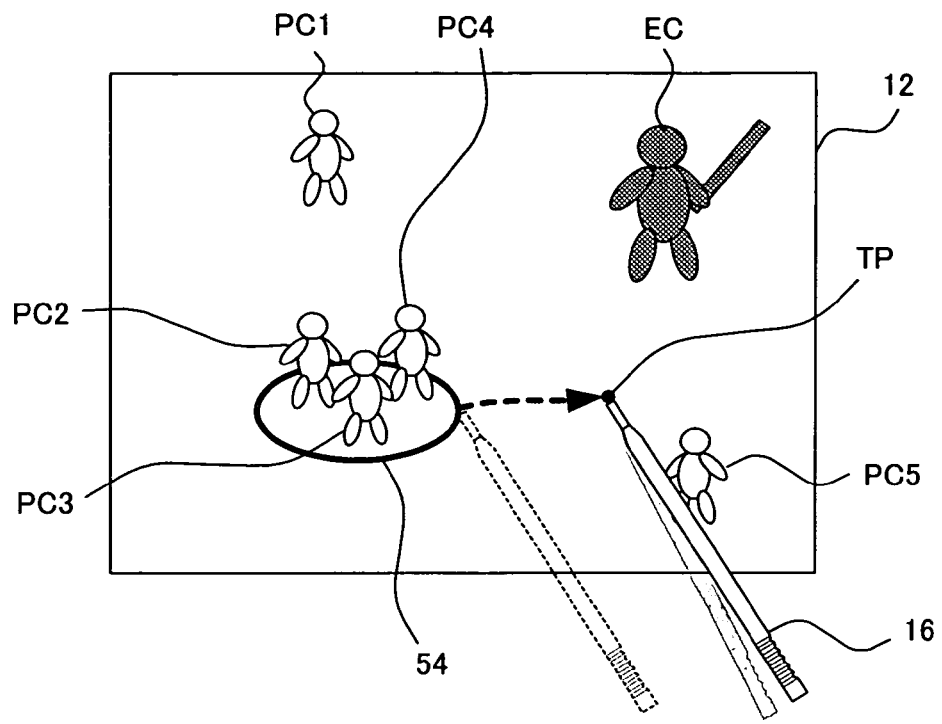
FIG. 8 shows further another example of a game image.
Figure 9:
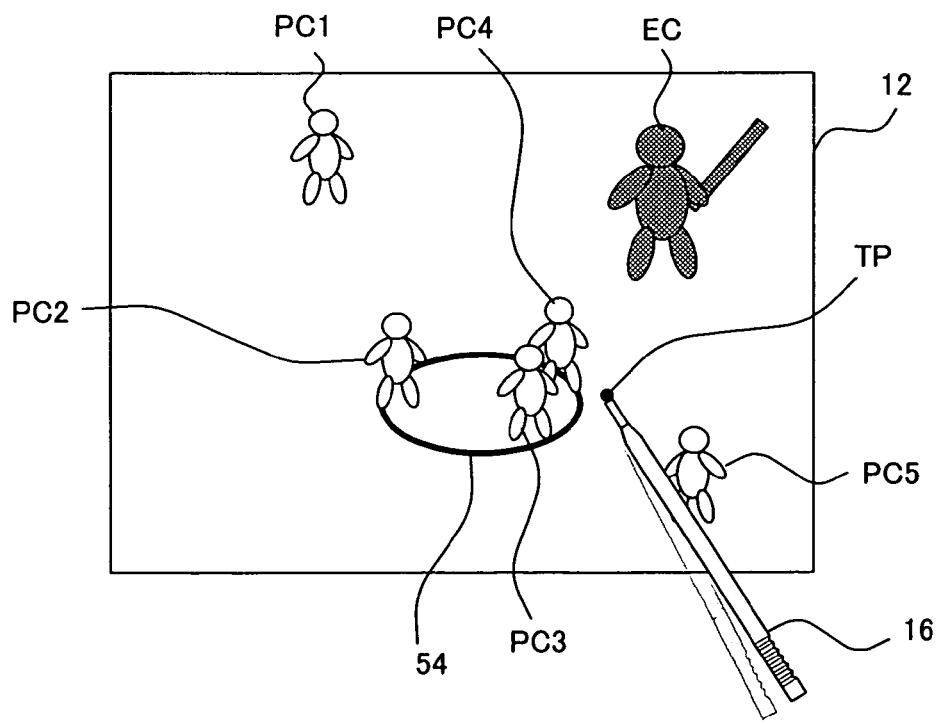
FIG. 9 shows further another example of a game image.

As shown in FIG. 8, the player can give the movement instruction to the controlled object characters by touching, with the stick 16, the selection indicating circle image 54 and then sliding the stick 16. When the player gives the movement instruction to the controlled object characters, each of the controlled object characters starts moving toward a current touch position TP. Since each player character has a different moving speed, as shown in FIG. 9, some player characters quickly come to the current touch position (e.g., PC3 and PC4), and other player characters slowly come to the current touch position (e.g., PC2). If the player removes the stick 16 from the touch panel 15 when the controlled object characters are moving toward the current touch position TP, the movement instruction is then cancelled, and the controlled object characters gather around a current middle point among the controlled object characters, and wait for an instruction.

As described above, the selection indicating circle image 54 is indicated also when the player is controlling the movement of the controlled object characters. Different colors of the selection indicating circle image 54 may be set for when the player is controlling the movement of the controlled object characters and for when the controlled object characters are waiting for an instruction from the player, respectively. Thus, even if the player unintentionally removes the stick 16 from the touch panel 15 when controlling the movement of the controlled object characters, and the movement instruction is cancelled as a result, the player can instantly recognize from the change of the color of the selection indicating circle image 54 that the movement instruction has been cancelled.

Figure 10:
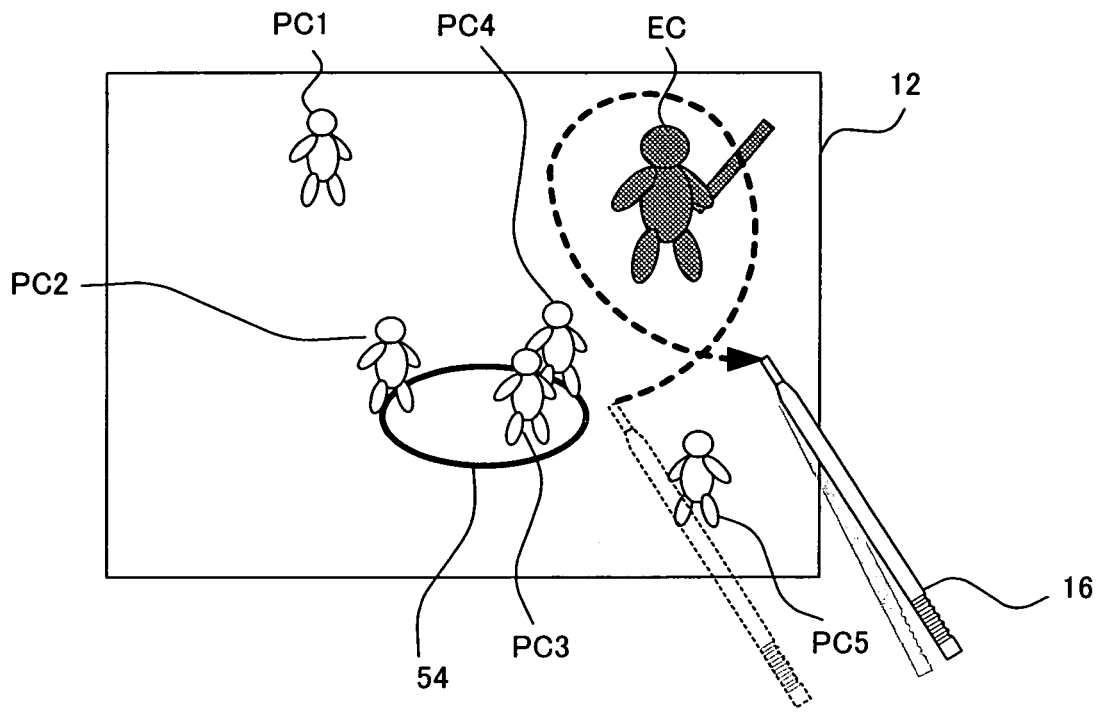
FIG. 10 shows further another example of a game image.
Figure 11:
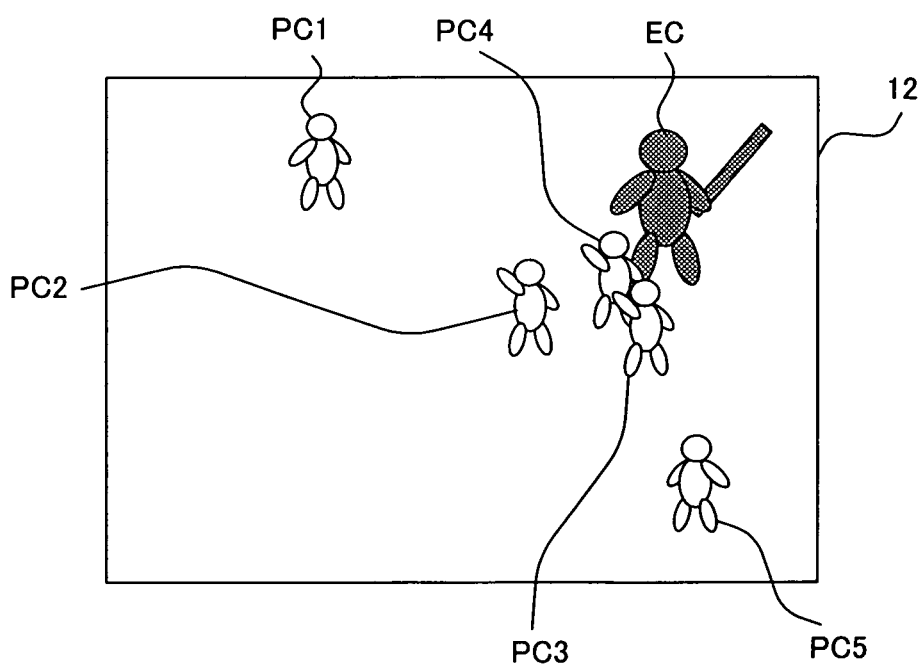
FIG. 11 shows further another example of a game image.

The player can give the attack instruction to the controlled object characters when the player is controlling the movement of the controlled object characters (i.e., when the player is sliding the stick 16 as shown in FIG. 8), by circling the enemy character EC with the stick 16, as shown in FIG. 10. When the player gives the attack instruction to the controlled object characters, the selection of the controlled object characters is cancelled (i.e., the game world again returns to a state where there does not exist any controlled object character), and then, as shown in FIG. 11, the player characters PC2 to PC4, which are given the attack instruction, attack the enemy character EC, which the player has circled by using the stick 16. Note that, when the selection of the controlled object characters is cancelled, the selection indicating circle image 54 disappears from the screen.

Figure 12:
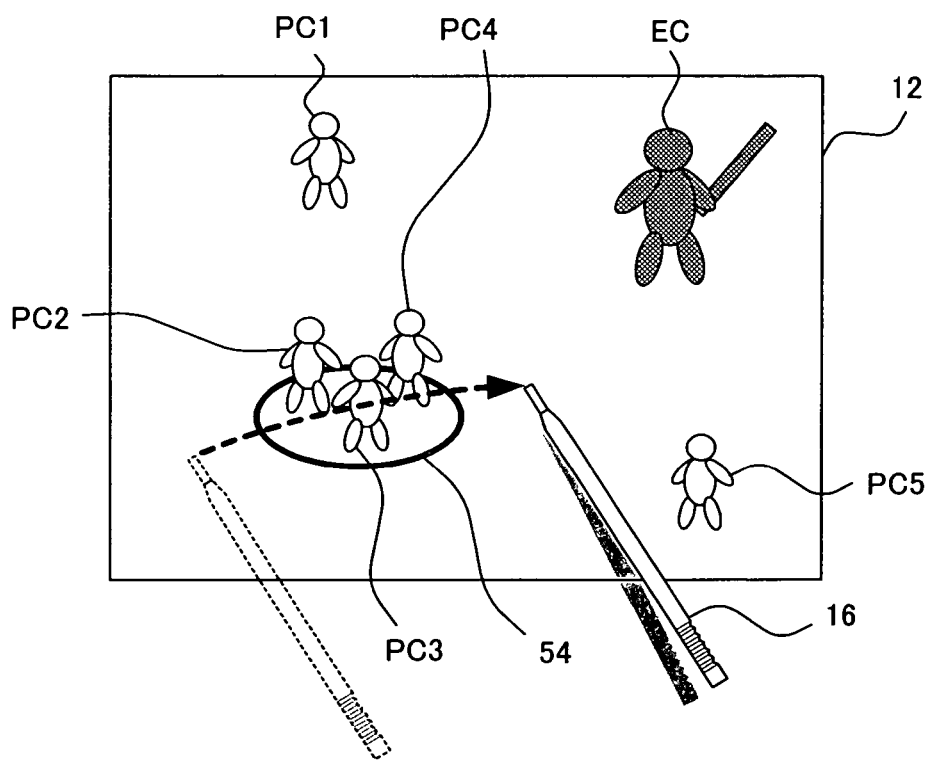
FIG. 12 shows further another example of a game image.

The dispersion instruction is an instruction to cancel the selection of the controlled object character. The player can give the dispersion instruction to the controlled object characters by sliding, as shown in FIG. 12, the stick 16 such that the stick 16 crosses the selection indicating circle image 54. When the selection of the controlled object characters is cancelled by the dispersion instruction, the player characters P2 to P4 start to move freely again.

Next, a sequence of processes performed by the CPU core 21 according to the game program 40 will be described with reference to a flow chart of FIG. 13.

When the game program 40 is executed, the CPU core 21 first performs initialization process at step S10. The initialization process includes, for example, placing the player characters and the enemy character in the game world.

Thereafter, processes at steps S12 to S34 are repeatedly performed at a predetermined cycle which synchronizes with a refresh cycle (commonly, every 1/60 second) of the screen of the second LCD 12.

At step S12, current input coordinates are detected based on the output signal from the touch panel 15, and then stored into the RAM 24 as the current input coordinates 50.

At step S14, an operation track information update process is performed. Hereinafter, the operation track information update process will be described in detail with reference to a flow chart of FIG. 14.

(Operation Track Information Update Process)

Figure 14:
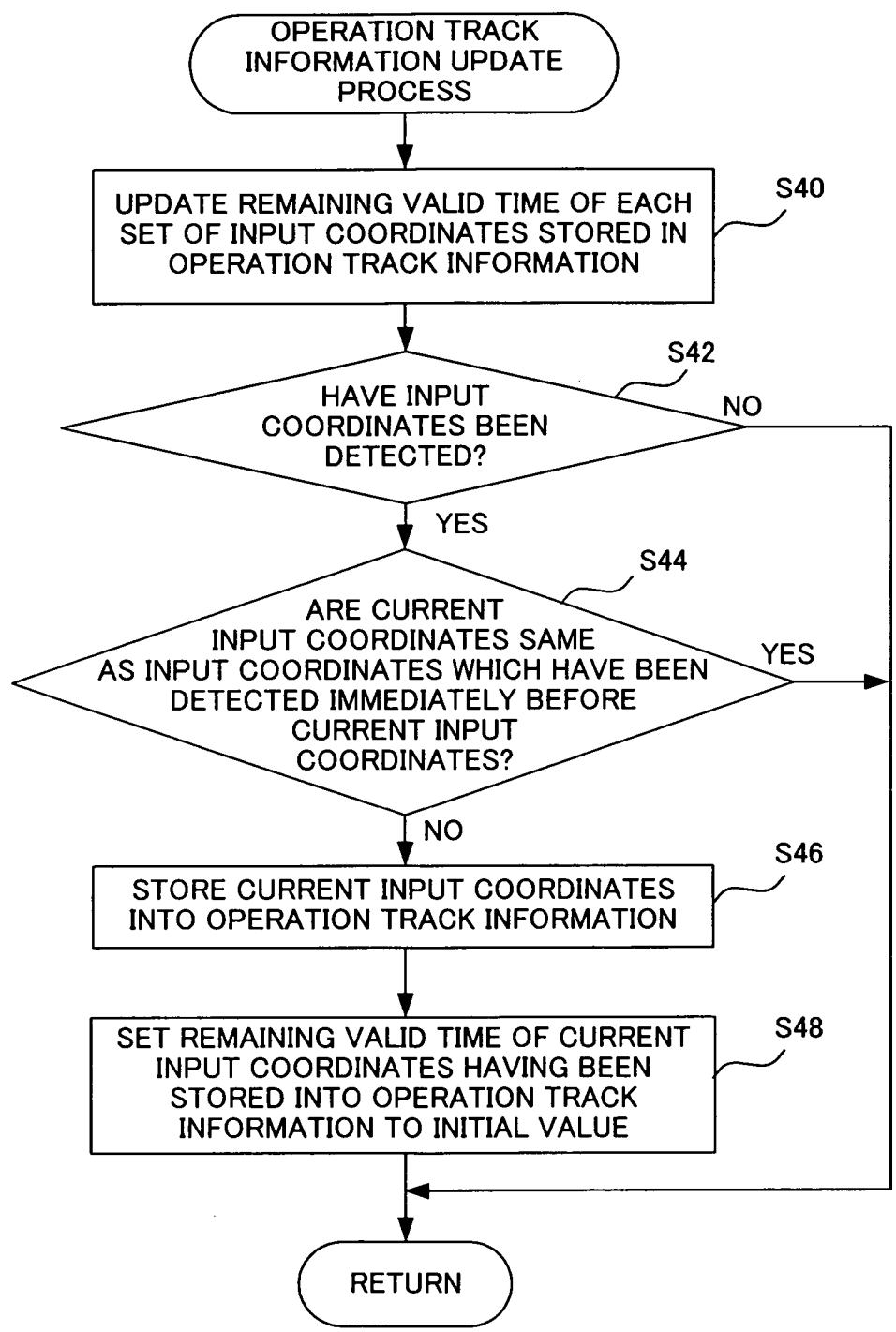
FIG. 14 is a flow chart showing a sequence of an operation track information update process.

At step S40 of FIG. 14, a remaining valid time of each set of input coordinates stored in the operation track information 52 is updated. During a time from the start of the game until a player first touches the touch panel 15, there does not exist any input coordinates in the operation track information 52. Therefore, no process is performed at step S40 during this time. The remaining valid time of input coordinates will be described later.

Figure 13:
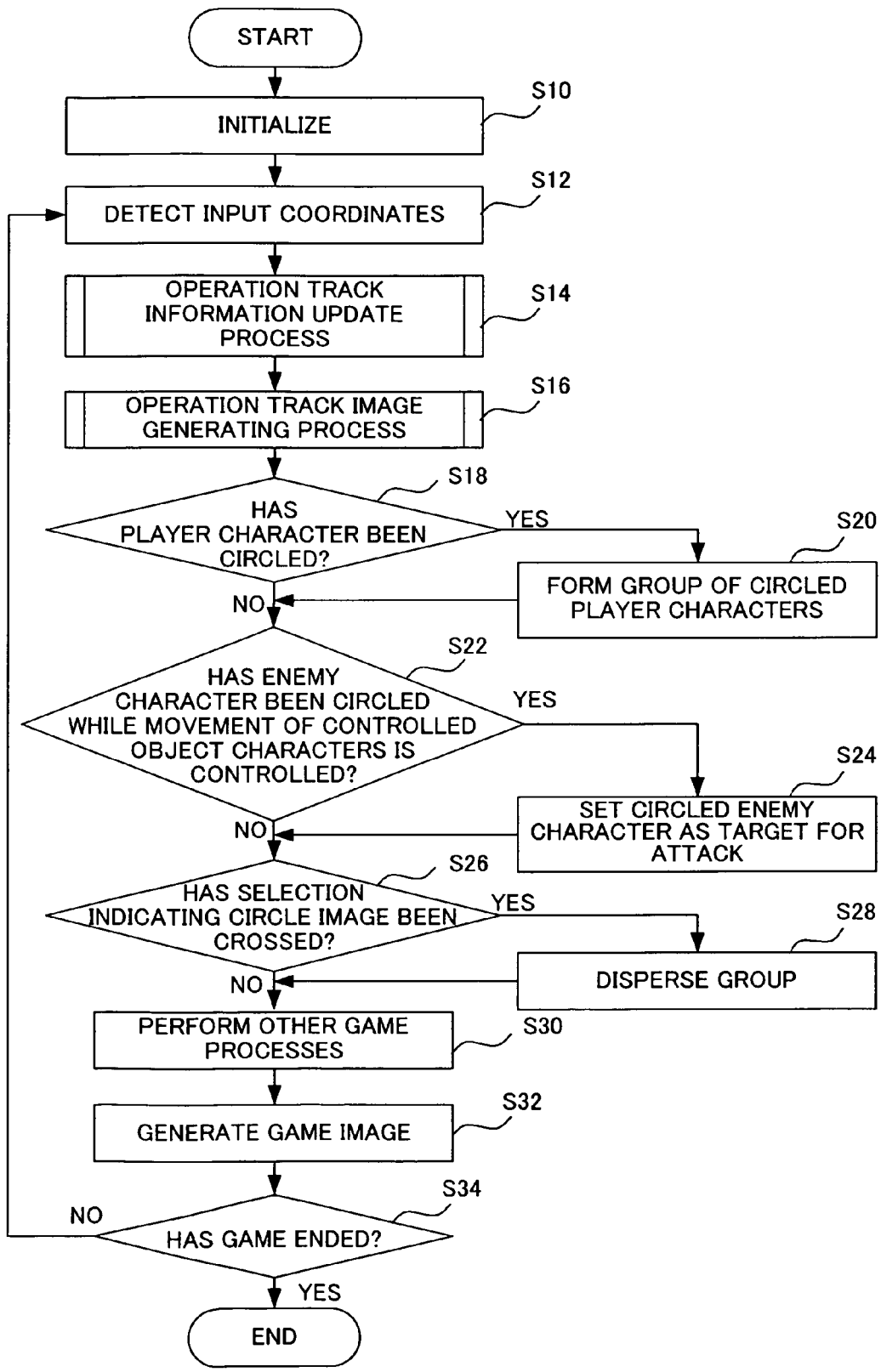
FIG. 13 is a flow chart showing a sequence of processes according to a game program.

At step S42, it is determined whether input coordinates have been detected at step S12 of FIG. 13. When it is determined that input coordinates have been detected, the process proceeds to step S44. When it is determined that no input coordinate has been detected, the operation track information update process is terminated, and then the process proceeds to step S16 of FIG. 13

At step S44, it is determined whether the input coordinates, which have been detected at step S12 of FIG. 13, i.e., the current input coordinates 50, are same as input coordinates which have been detected immediately before the current input coordinates 50 (i.e., newest input coordinates stored in the operation track information 52). If it is determined that the current input coordinates 50 are same as the newest input coordinates stored in the information 52, the operation track information update process is terminated, and the process proceeds to step S16 of FIG. 13. If it is determined that the current input coordinates 50 are not the same as the newest input coordinates stored in the information 52, the process proceeds to step S46.

Note that, the above-described process at step S44 is for avoiding, when the same input coordinates are continuously detected, redundantly storing the input coordinates into the operation track information 52, in order to save a storage area of the RAM 24. However, the certain exemplary embodiments described herein are not limited thereto. Each set of detected input coordinates may be unconditionally and sequentially stored into the operation track information 52 without performing a determination process at step S44.

At step S46, the current input coordinates, which have been detected at step S12 of FIG. 13, are stored into the operation track information 52.

At step S48, the remaining valid time of the current input coordinates, which have been newly stored into the operation track information 52 at step S46, is set to an initial value (e.g., 10).

Next, a detailed example of the operation track information update process will be described with reference to FIGS. 15 to 20.

FIG. 15 shows an example of a set of input coordinates which are detected, at each frame after the game starts, by the process at step S12 of FIG. 13. In FIG. 15, no input coordinates are detected at first and second frames; input coordinates (X1, Y1) are detected at each of third to fifth frames; different coordinates are detected at each of sixth to eighteenth frames; and no input coordinates are detected at nineteenth and twentieth frames. This means that the player touches the touch panel 15 with the stick 16 at the third frame, slides the stick 16 on the touch panel 15 from the sixth frame to the eighteenth frame, and removes the stick 16 from the touch panel 15 at the nineteenth frame.

FIGS. 16 to 20 show that the operation track information 52 varies when an input operation is performed as shown in FIG. 15.

At the third frame, the input coordinates (X1, Y1) are detected by the process at step S12 of FIG. 13. Then, as shown in FIG. 16, the input coordinates (X1, Y1) are stored into the operation track information 52 by the process at step S46 of FIG. 14. As a matter of convenience, the input coordinates are hereinafter referred to as input coordinates P1. Further, the remaining valid time of the input coordinates P1 is set to the initial value by the process at step S48 of FIG. 14, (here, the initial value is 10).

At the fourth frame, the input coordinates (X1, Y1) are detected by the process at step S12 of FIG. 13. Then, the remaining valid time of the input coordinates P1 is updated to 9 by the process at step S40 of FIG. 14. Note that, since the input coordinates (X1,Y1) detected at step S12 of FIG. 13 are same as the input coordinates P1, the input coordinates (X1, Y1) are not stored into the operation track information 52.

At the fifth frame, the input coordinates (X1, Y1) are detected by the process at step S12 of FIG. 13. Then, the remaining valid time of the input coordinates P1 is updated to 8 by the process at step S40 of FIG. 14. Note that, since the input coordinates (X1,Y1) detected at step S12 of FIG. 13 are same as the input coordinates P1, the input coordinates (X1, Y1) are not stored into the operation track information 52.

At the sixth frame, input coordinates (X2,Y2) are detected by the process at step S12 of FIG. 13. Then, the remaining valid time of the input coordinates P1 is updated to 7 by the process at step S40 of FIG. 14. Further, as shown in FIG. 17, the input coordinates (X2, Y2) are stored into the operation track information 52. As a matter of convenience, the input coordinates are hereinafter referred to as input coordinates P2. Further, the remaining valid time of the input coordinates P2 is set to the initial value by the process at step S48 of FIG. 14, (here, the initial value is 10).

At the seventh frame, input coordinates (X3, Y3) are detected by the process at step S12 of FIG. 13. Then, by the process at step S40 of FIG. 14, the remaining valid times of the input coordinates P1 and P2 are updated to 6 and 9, respectively. As shown in FIG. 18, the input coordinates (X3, Y3) are stored into the operation track information 52. As a matter of convenience, the input coordinates are hereinafter referred to as input coordinates P3. Further, the remaining valid time of the input coordinates P3 is set to the initial value by the process at step S48 of FIG. 14, (here, the initial value is 10).

Hereinafter, the update of the remaining valid time and the storing of new input coordinates are repeated in the same manner.

FIG. 19 shows a state of the operation track information 52 at a point when the processes at the thirteenth frame have been completed. At this point, the remaining valid time of the input coordinates P1 is 0. This indicates that the input coordinates P1 has been invalidated. Similarly, FIG. 20 shows a state of the operation track information 52 at a point when the processes at the sixteenth frame have been completed. At this point, in addition to the remaining valid time of the input coordinates P1, the remaining valid time of the input coordinates P2 is 0. This indicates that the input coordinates P1 and P2 have been invalidated. Such input coordinates, which have been invalidated, may be deleted from the RAM 24 if required.

As described above, in the operation track information update process, while each set of input coordinates is sequentially stored into the operation track information 52, the each set of input coordinate is also sequentially invalidated when 10 frame periods have passed after the each set of input coordinates has been stored into the operation track information (i.e., when the screen of the second LCD 12 has been refreshed 10 times).

In the present embodiment, the initial value of the remaining valid time is predetermined as 10 in order to facilitate the understanding of the above description, but the certain exemplary embodiments are not limited thereto. As is clear from the above description, the initial value of the valid time defines the time until the input coordinates stored in the operation track information 52 become invalid. Thus, the initial value greatly affects an operability of the game. Therefore, the initial value of the remaining valid time should be set so that a favorable operability can be obtained. Alternatively, the initial value of the remaining valid time may be discretionarily set by a player, or may be automatically changed to an appropriate value while the game is played. Further alternatively, the initial value of the remaining valid time may be changed whenever necessary according to contents of the operation track information 52 (e.g., according to a distance or a positional relationship between points respectively corresponding to input coordinates stored in the information 52).

When the operation track information update process of FIG. 13 is completed, the CPU core 21 performs an operation track image generating process at step S16. Hereinafter, the operation track image generating process will be described in detail with reference to a flow chart of FIG. 21.

(Operation Track Image Generating Process)

Figure 21:
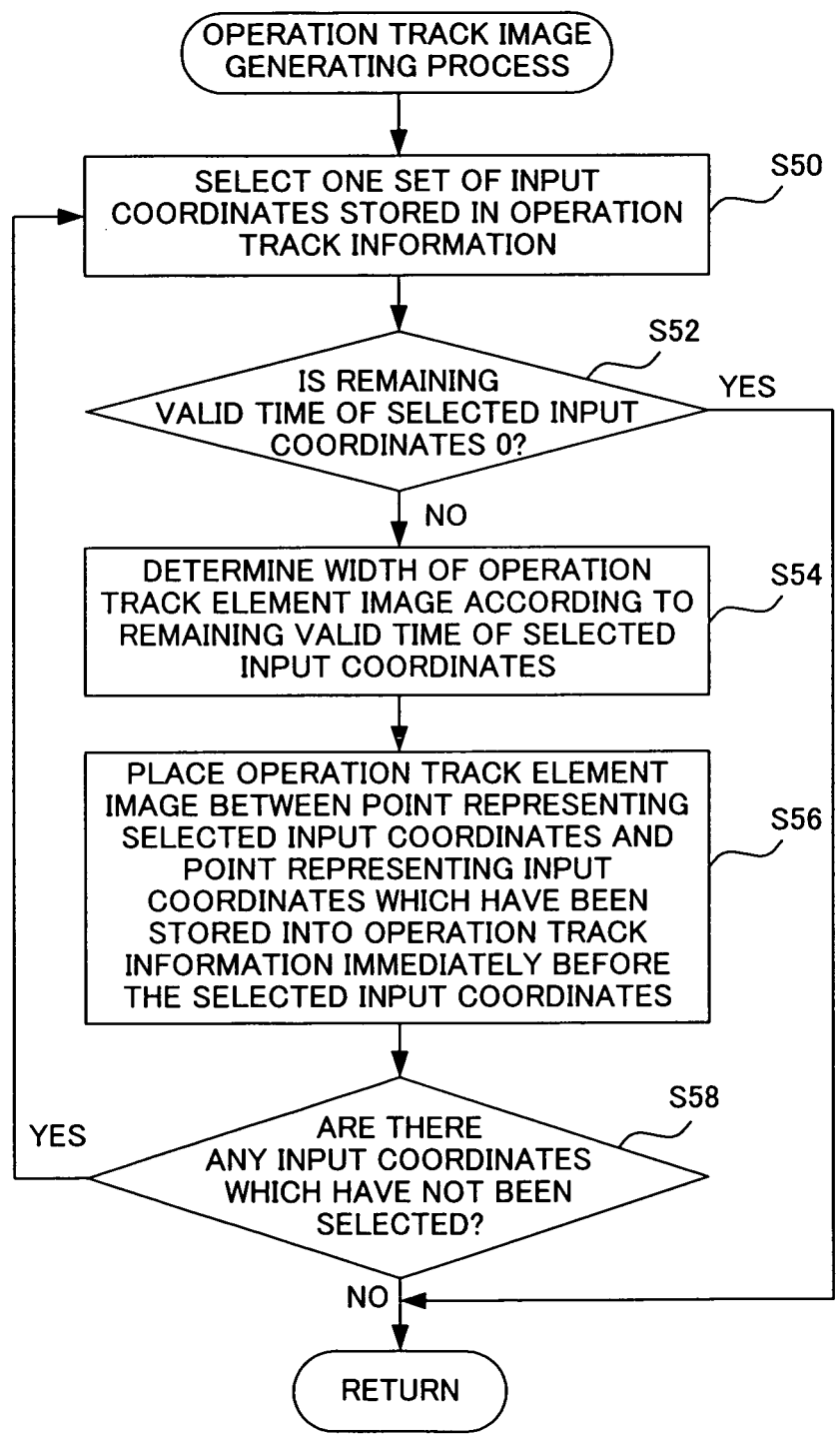
FIG. 21 shows a flow chart showing a sequence of an operation track image generating process.

At step S50 of FIG. 21, one set of input coordinates is selected among input coordinates stored in the operation track information 52. Here, it is assumed that each set of input coordinates stored in the operation track information 52 is sequentially selected from the newest stored one to the oldest stored one. Therefore, immediately after the operation track image generating process starts, the newest stored input coordinates are selected among the input coordinates stored in the operation track information 52.

At step S52, it is determined whether the remaining valid time of the input coordinates selected at step S50 is "0". When it is determined as "0", the operation track image generating process is terminated, and the process proceeds to step S18 of FIG. 13. When it is determined as not "0", the process proceeds to step S54.

At step S54, a width of an operation track element image is determined according to the remaining valid time of the input coordinates selected at step S50.

At step S56, the operation track element image is placed between a point corresponding to the input coordinates selected at step S50 and a point corresponding to input coordinates (i.e., newest input coordinates after the input coordinates selected at step S50) which have been stored into the operation track information 52 immediately before the input coordinates selected at step S50.

At step S58, it is determined whether there exist, in the operation track information 52, input coordinates which have not been selected at step S50 (i.e., input coordinates which have not been processed). When it is determined that there exist such input coordinates, the process returns to step S50. When it is determined that there do not exist such input coordinates, the operation track image generating process is terminated, and the process proceeds to step S18 of FIG. 13.

Thus, the processes at steps S54 and S56 are performed with respect to all valid input coordinates stored in the operation track information 52. Hereinafter, examples of the above mentioned processes at steps S54 and S56 are described with reference to FIGS. 22 to 25.

It is assumed that: four sets of input coordinates Pa to Pd respectively corresponding to four points Pa to Pd as shown in FIG. 22 are stored in the operation track information 52; the remaining valid time of the input coordinates Pa is 7; the remaining valid time of the input coordinates Pb is 8; the remaining valid time of the input coordinates Pc is 9; and the remaining valid time of the input coordinates Pd is 10. In this case, firstly, the input coordinates Pd is selected at step S50. Thereafter, at step S54, as shown in FIG. 23, a width of an operation track element image to be placed between the points Pc and Pd is determined as 10 (i.e., the remaining valid time of the input coordinates Pd), and at the following step S56, the operation track element image is placed between the points Pc and Pd.

Next, at step S50, the input coordinates Pc is selected. Thereafter, at step S54, as shown in FIG. 23, the width of the operation track element image to be placed between the input coordinates Pb and Pc is determined as 9 (i.e., the remaining valid time of the input coordinates Pc), and at the following step S56, the operation track element image is placed between the input coordinates Pb and Pc.

Figures 24, 25:
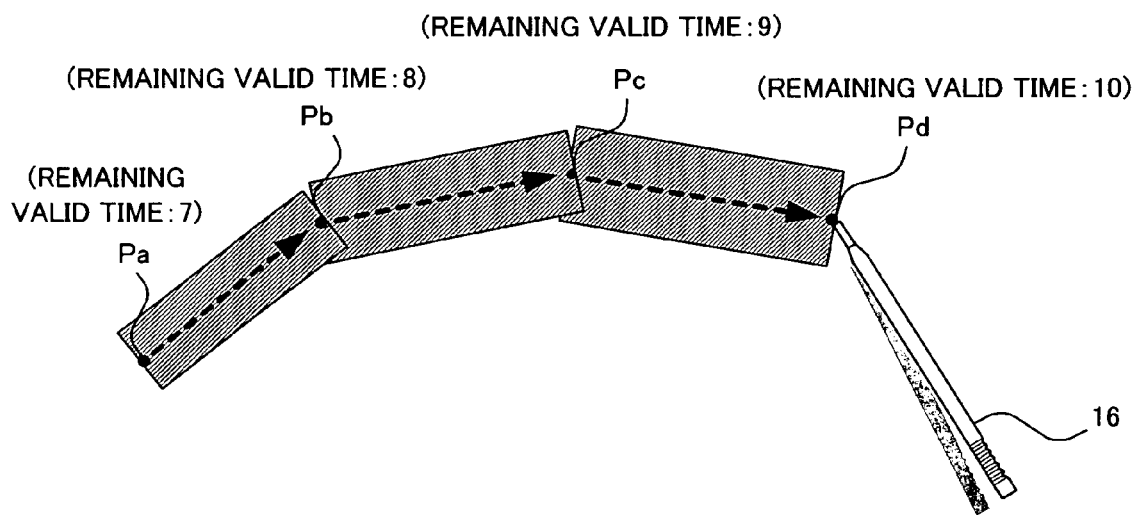
FIG. 24 shows another example of the operation track element image.
FIG. 25 shows an exemplary alignment of the operation track element images.

As a result of repeating the same process, such image as shown in FIG. 25 is obtained.

In the present embodiment, a rectangular shape is used for an operation track element image, but the certain exemplary embodiments are not limited thereto. For example, a trapezoidal operation track element image shown in FIG. 24 may be used. In an example shown in FIG. 24, a width of an operation track element image placed between the points Pc and Pd gradually changes, from the point Pc toward the point Pd, from 9 (i.e., the remaining valid time of the input coordinates Pc) to 10 (i.e., the remaining valid time of the input coordinates Pd). Thus, an outline of the image of the operation track is smoothened.

When the operation track image generating process of FIG. 13 is completed, the CPU core 21 determines, at step S18, whether a player character has been circled by an operation track which comprises points respectively corresponding to the valid input coordinates stored in the operation track information 52 (hereinafter, referred to as a valid operation track). When it is determined that the player character has been circled, the process proceeds to step S20. When it is determined that the player character has not been circled, the process proceeds to step S22. A manner for determining whether the player character has been circled by the valid operation track may be defined discretionarily. For example, it may be determined whether line segments, which respectively connect the points respectively corresponding to the valid input coordinates stored in the information 52, have intersected one another (i.e., whether a closed area is formed by the valid operation track), the points being connected in an order in which the valid input coordinates have been stored into the operation track information 52. When it is determined that a closed area is formed by the valid operation track, it is further determined whether there exists a player character within the closed area.

At step S20, player characters circled by the valid operation track are selected as controlled object characters, and points toward which the controlled object characters move (hereinafter, referred to as movement target points) are set, respectively, such that the controlled object characters gather and form a group. To be specific, the same number of movement target points as the number of the controlled object characters is set within the selection indicating circle image 54 shown in FIG. 6. Each controlled object character starts moving toward one of the movement target points which is the closest point to a current position of the each controlled object character. As a result (e.g., when 60 frames have passed), the controlled object characters come to such positions as shown in FIG. 7

At step S22, it is determined whether an enemy character has been circled as shown in FIG. 10 with a valid operation track, while the movement of the controlled object characters is controlled. When it is determined that the enemy character has been circled by the valid operation track, the process proceeds to step S24. When it is determined that the enemy character has not been circled by the valid operation track, the process proceeds to step S26.

At step S24, the enemy character circled by the valid operation track is set as a target for an attack by a group of the controlled object characters whose movement has been controlled.

At step S26, it is determined whether a valid operation track has crossed the selection indicating circle image 54 as shown in FIG. 12. When it is determined that the valid operation track has crossed the image 54, the process proceeds to step S28. When it is determined that the valid operation track has not crossed the image 54, the process proceeds to step S30.

At step S28, the selection of the controlled object characters is cancelled to disperse the group formed at step S20.

At step S30, various processes required for advancing the game are performed, such as movement processing of each character, an animating process of each character, an update of a parameter indicating a status of each character, generating game sounds, and scroll processing of the screen.

At step S32, a game image including the image of the operation track, which has been generated by the operation track image generating process at step S16, is generated, and the game image is displayed on the second LCD 12.

At step S34, it is determined whether the game has ended. When it is determined that the game has ended, an execution of the game program 40 is terminated. When it is determined that the game has not ended, the process returns to step S12, and the above described processes are performed at a next frame.

As described above, according to the present embodiment, each set of input coordinates is sequentially invalidated when a predetermined period of time has passed after the each set of input coordinates has been stored into the operation track information, and an operation track comprising the points respectively corresponding to valid input coordinates is used for game processing. Accordingly, for example, if a player slowly circles, with the stick 16, a player character or an enemy character, the above-described selection of a controlled object character or the attack instruction is not inputted. This means that the player is required to quickly circle the player character or the enemy character, in order to input the selection of the controlled object character or the attack instruction. The reason why the present embodiment requires a player to quickly input the selection of the controlled object character, the attack instruction or the dispersion instruction is to avoid these instructions to be accidentally inputted without the player's intent (e.g., to avoid the attack instruction or the dispersion instruction to be unintentionally inputted when the player is controlling the movement of the controlled object characters).

Further, according to the present embodiment, since the operation track, which comprises the points respectively corresponding to the valid input coordinates stored in the operation track information, is displayed on the screen, the player can easily recognize the shape of a currently-valid operation track.

Figure 26:
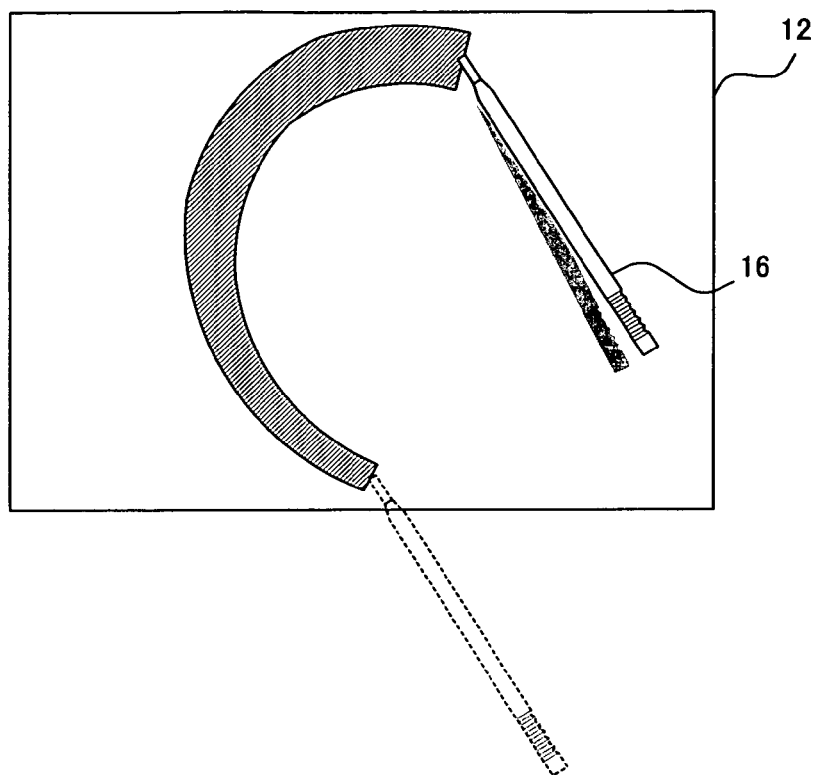
FIG. 26 shows an exemplary input operation performed by using the touch panel.

Moreover, according to the present embodiment, the width of the operation track displayed on the screen partially changes according to the remaining valid time of each of the input coordinates respectively corresponding to the points which constitute the operation track. Therefore, the player can intuitively recognize the remaining valid time of each portion of the operation track displayed on the screen. For example, as shown in FIG. 26, the player can roughly recognize the remaining valid time of input coordinates the player has first inputted, from the width of the portion of the operation track, the portion being on a point where the player has first touched the touch panel with the stick (i.e., a point at which the stick shown by a broken line contacts the touch panel).

Figure 27:
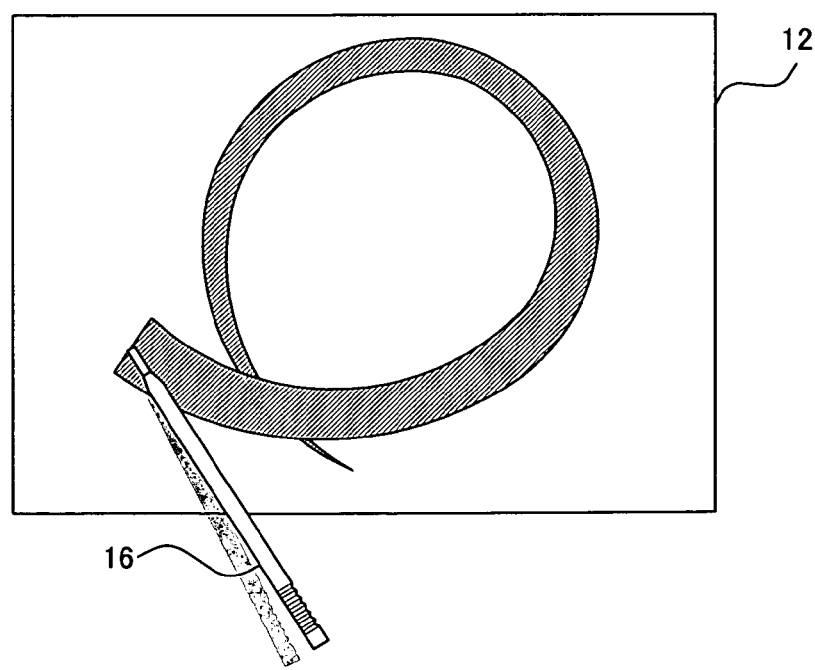
FIG. 27 shows a successful example of the input operation.
Figure 28:
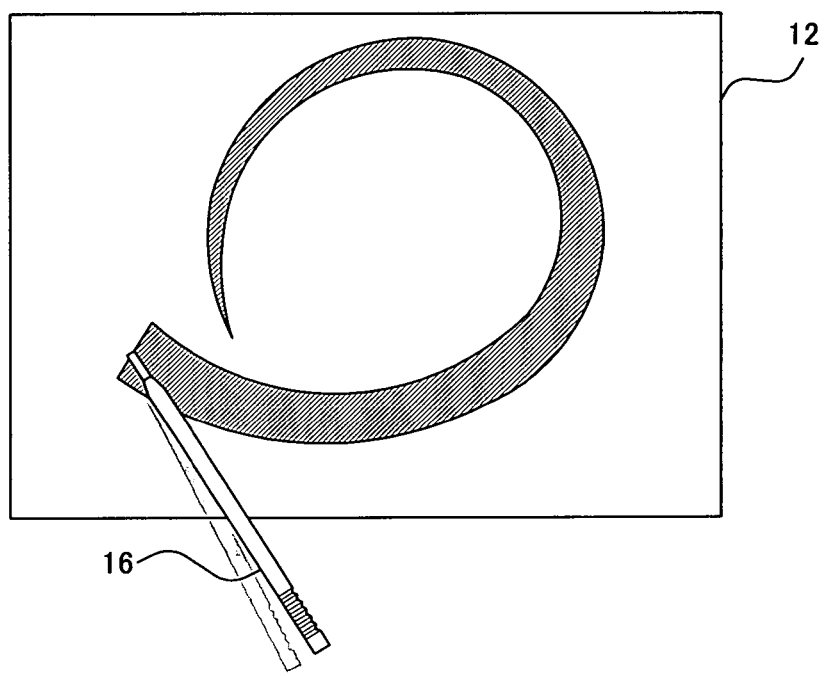
FIG. 28 shows a failure example of the input operation.

FIG. 27 shows an exemplary case where a player performs an input operation with an appropriate speed. FIG. 28 shows an exemplary case where a player fails to perform the input operation with the appropriate speed. If the player fails to perform the input operation with the appropriate speed, the player can learn, from the image of the operation track made at that time, the appropriate speed of the input operation.

In the present embodiment, the width of the operation track is partially changed according to the remaining valid time of the input coordinates, but the certain exemplary embodiments are not limited thereto. For example, the color or transparency of the operation track may be partially changed according to the remaining valid time of the input coordinates. Preferably, as the amount of remaining valid time of the input coordinates decreases, the color of the portion of the operation track may be lightened, the portion being on a point corresponding to the input coordinates. A manner for lightening the color may be: lightening the color of the image of the operation track portion; having the color of the image of the operation track portion look lighter by dithering; and changing a parameter which indicates the transparency of the image of the operation track portion.

While certain exemplary embodiments have been described in detail, the foregoing description is in all aspects illustrative and not restrictive. It is understood that numerous other modifications and variations can be devised without departing from the scope of these exemplary embodiments.

What is claimed is:

1. A computer-readable storage medium storing a game program for causing a computer, which is connected to a display for displaying a game image, a coordinate input device for inputting coordinates corresponding to a point on a screen of the display and a memory for temporarily storing data, to function as:
   storing programmed logic circuitry for, from a start of coordinates inputting until an end of coordinates inputting by the coordinate input device, sequentially storing into the memory, as a piece of valid coordinate data, a piece of coordinate data indicating the coordinates inputted by the coordinate input device;
   invalidating programmed logic circuitry for sequentially invalidating each piece of valid coordinate data in a valid coordinate data array stored in the memory, based on a time period passed from when each piece of valid coordinate data has been stored into the memory;
   a game processor for performing game processing by using the valid coordinate data array stored in the memory;
   track image generating programmed logic circuitry for generating an image of an operation track which comprises points respectively corresponding to a plurality of pieces of valid coordinate data stored in the memory, the image having a display mode which partially changes according to a time until each of the plurality of pieces of valid coordinate data stored in the memory is invalidated by the invalidating programmed logic circuitry; and
   display control programmed logic circuitry for causing the display to display, according to a result of the game processing by the game processor, a game image including the image of the operation track generated by the track image generating programmed logic circuitry.

2. The computer-readable storage medium according to claim 1, wherein the track image generating programmed logic circuitry partially changes a width of the image of the operation track.

3. The computer-readable storage medium according to claim 1, wherein the track image generating programmed logic circuitry partially changes a color of the image of the operation track.

4. The computer-readable storage medium according to claim 1, wherein,
   the image of the operation track, which is generated by the track image generating programmed logic circuitry, comprises a plurality of operation track element images respectively corresponding to line segments which respectively connect points respectively corresponding to a plurality of pieces of valid coordinate data, the points being connected in an order in which the plurality of pieces of valid coordinate data has been inputted; and
   the track image generating programmed logic circuitry changes the display mode of each of the plurality of operation track element images, according to a remaining time until a piece of coordinate data of at least one end of a corresponding line segment is invalidated by the invalidating programmed logic circuitry.

5. The computer-readable storage medium according to claim 4, wherein the track image generating programmed logic circuitry gradually narrows a width of each of the plurality of operation track element images as the remaining time decreases, the remaining time being a time period until a piece of coordinate data of at least one end of a corresponding line segment is invalidated by the invalidating programmed logic circuitry.

6. The computer-readable storage medium according to claim 4, wherein the track image generating programmed logic circuitry gradually lightens a color of each of the plurality of operation track element images as the remaining time decreases, the remaining time being a time period until a piece of coordinate data of at least one end of a corresponding line segment is invalidated by the invalidating programmed logic circuitry.

7. The computer-readable storage medium according to claim 1, wherein the game processor performs predetermined game processing corresponding to a predetermined condition when a shape of the operation track, which comprises points respectively corresponding to the valid coordinate data array stored in the memory, satisfies the predetermined condition.

8. A computer-readable storage medium storing a game program for causing a computer, which is connected to a display for displaying a game image, coordinate input programmed logic circuitry for inputting coordinates corresponding to a point on a screen of the display and a memory for temporarily storing data, to function as:
   storing programmed logic circuitry for, from a start of coordinates inputting until an end of coordinates inputting by the coordinate input programmed logic circuitry, sequentially storing into the memory, as a piece of valid coordinate data, a piece of coordinate data indicating the coordinates inputted by the coordinate input programmed logic circuitry;
   invalidating programmed logic circuitry for sequentially invalidating each piece of valid coordinate data in a valid coordinate data array stored in the memory, based on a time period passed from when each piece of valid coordinate data has been stored into the memory;
   a game processor for performing predetermined game processing corresponding to a predetermined condition when a shape of an operation track, which comprises points respectively corresponding to the valid coordinate data array stored in the memory, satisfies the predetermined condition; and
   a display controller for causing the display to display a game image according to a result of the game processing by the game processor.

9. The computer-readable storage medium according to claim 8, wherein the predetermined condition is that a discretionarily-selected area on the screen is circled by the operation track.

10. The computer-readable storage medium according to claim 8, wherein the predetermined condition is that the operation track crosses a predetermined area on the screen.

11. A game device, comprising:
   a display for displaying a game image;
   a coordinate input device for inputting coordinates corresponding to a point on a screen of the display;
   a memory for temporarily storing data;
   storing programmed logic circuitry for, from a start of coordinates inputting until an end of coordinates inputting by the coordinate input device, sequentially storing into the memory, as a piece of valid coordinate data, a piece of coordinate data indicating the coordinates inputted by the coordinate input device;
   invalidating programmed logic circuitry for sequentially invalidating each piece of valid coordinate data in a valid coordinate data array stored in the memory, based on a time period passed from when each piece of valid coordinate data has been stored into the memory;
   a game processor for performing game processing by using the valid coordinate data array stored in the memory;
   track image generating programmed logic circuitry for generating an image of an operation track which comprises points respectively corresponding to a plurality of pieces of valid coordinate data stored in the memory, the image having a display mode which partially changes according to a time until each of the plurality of pieces of valid coordinate data stored in the memory is invalidated by the invalidating programmed logic circuitry; and a display controller for causing the display to display, according to a result of the game processing by the game processor, a game image including the image of the operation track generated by the track image generating programmed logic circuitry.

* * * * *